(12) United States Patent
Dhawan et al.

(10) Patent No.: US 11,412,583 B2
(45) Date of Patent: *Aug. 9, 2022

(54) REUSABLE MICROWAVEABLE VESSEL

(71) Applicant: NESTEC S.A., Vevey (CH)

(72) Inventors: Sumeet Dhawan, Twinsburg, OH (US); Ulrich Johannes Erle, Cleveland, OH (US); Erich Heinze, Streetsboro, OH (US); Christine Frances Kunetz, Twinsburg, OH (US)

(73) Assignee: Societe des Produits Nestle S.A., Vevey (CH)

( * ) Notice: Subject to any disclaimer, the term of this patent is extended or adjusted under 35 U.S.C. 154(b) by 416 days.

This patent is subject to a terminal disclaimer.

(21) Appl. No.: 16/066,371

(22) PCT Filed: Nov. 1, 2016

(86) PCT No.: PCT/EP2016/076283
§ 371 (c)(1),
(2) Date: Jun. 27, 2018

(87) PCT Pub. No.: WO2017/114605
PCT Pub. Date: Jul. 6, 2017

(65) Prior Publication Data
US 2019/0159301 A1 May 23, 2019

Related U.S. Application Data

(60) Provisional application No. 62/272,806, filed on Dec. 30, 2015.

(51) Int. Cl.
H05B 6/64 (2006.01)
A47J 36/02 (2006.01)
B65D 81/34 (2006.01)

(52) U.S. Cl.
CPC .......... H05B 6/6494 (2013.01); A47J 36/027 (2013.01); B65D 81/3453 (2013.01);
(Continued)

(58) Field of Classification Search
CPC .............. H05B 6/6494; B65D 81/3453; B65D 2581/3494; B65D 2581/3495;
(Continued)

(56) References Cited

U.S. PATENT DOCUMENTS 3,302,632 A * 2/1967 Fichtner ............. B65D 81/3453
219/728
4,190,757 A * 2/1980 Turpin ............... B65D 81/3446
219/729

(Continued)

FOREIGN PATENT DOCUMENTS

EP 2326141 5/2011
WO 2007133767 11/2007
WO 2007141140 12/2007

Primary Examiner — John J Norton
(74) Attorney, Agent, or Firm — K&L Gates LLP

(57) ABSTRACT

The present invention relates to a vessel having an area for holding at least one food item for being heated in a solid state microwave oven. Additionally, disclosed is a method for heating a food item in a solid state microwave oven. Particularly, the vessel comprises a tray having an area for holding at least one food item and a susceptor wherein there is a thermal insulation between the susceptor and the food item. The tray may include two- or multi-compartment configurations wherein the susceptor only spans at least along a portion of one compartment to heat various food item simultaneously within a solid state microwave oven.

14 Claims, 7 Drawing Sheets

(52) U.S. Cl.
CPC ..... H05B 6/6408 (2013.01); *B65D 2581/344* (2013.01); *B65D 2581/3472* (2013.01); *B65D 2581/3497* (2013.01); *B65D 2581/3498* (2013.01); *Y02W 30/80* (2015.05)

(58) Field of Classification Search
CPC ..... B65D 2581/3497; B65D 2581/3498; A47J 36/027
See application file for complete search history.

(56) References Cited

U.S. PATENT DOCUMENTS

| | | | | |
|---|---|---|---|---|
| 5,008,024 | A * | 4/1991 | Watkins | B65D 3/14 219/727 |
| 5,173,580 | A * | 12/1992 | Levin | B65D 81/3446 219/730 |
| 5,231,268 | A * | 7/1993 | Hall | B65D 81/3446 219/730 |
| 5,565,125 | A * | 10/1996 | Parks | B65D 81/3446 219/759 |
| 5,565,228 | A * | 10/1996 | Gics | B65D 81/3453 426/107 |
| 9,049,751 | B1 * | 6/2015 | Erle | H05B 6/80 |
| 2004/0118837 | A1 * | 6/2004 | Samuels | A47J 36/027 219/725 |
| 2006/0289522 | A1 * | 12/2006 | Middleton | B65D 77/0433 219/730 |
| 2007/0221666 | A1 * | 9/2007 | Keefe | H05B 6/6408 219/728 |
| 2009/0208614 | A1 * | 8/2009 | Sharma | B65D 81/3453 426/107 |
| 2010/0078428 | A1 * | 4/2010 | Schaefer | B65D 81/3453 219/730 |
| 2011/0204046 | A1 * | 8/2011 | Middleton | B65D 81/3453 219/730 |
| 2014/0008353 | A1 * | 1/2014 | Niklasson | H05B 6/6488 219/601 |
| 2014/0190954 | A1 * | 7/2014 | Geren | H05B 6/105 219/482 |
| 2015/0096976 | A1 | 4/2015 | France | |
| 2020/0299052 | A1 * | 9/2020 | Dhawan | B65D 81/3453 |

\* cited by examiner

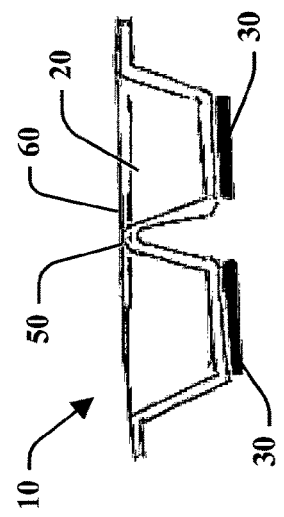
FIG. 8A
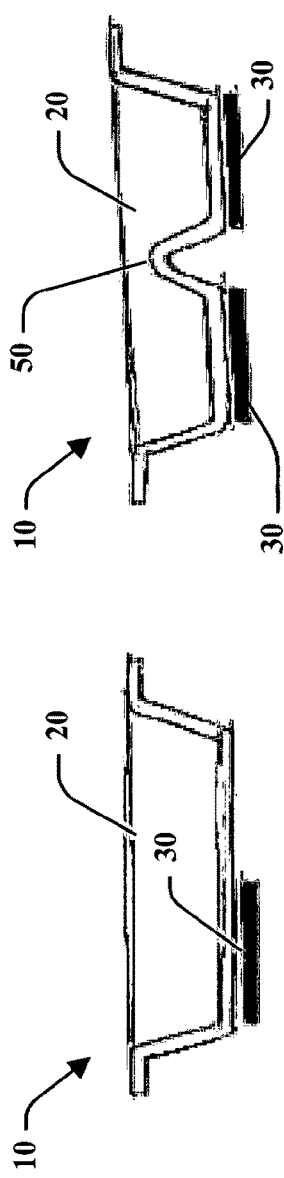
FIG. 8B
FIG. 8C
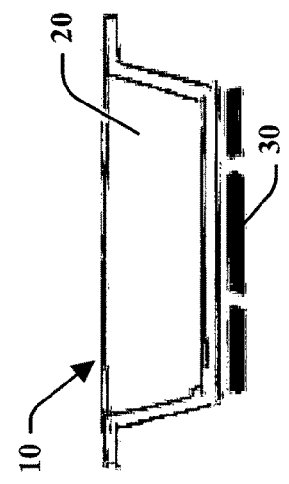
FIG. 8D
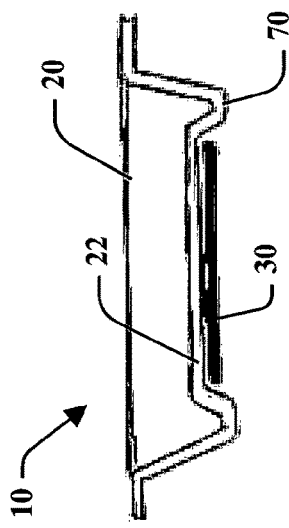
FIG. 8E
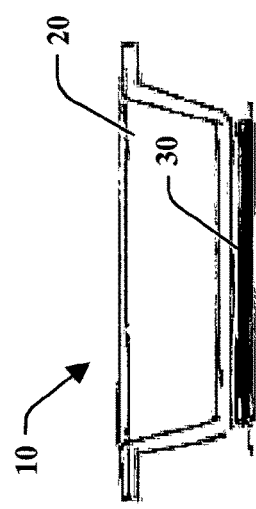
FIG. 8F
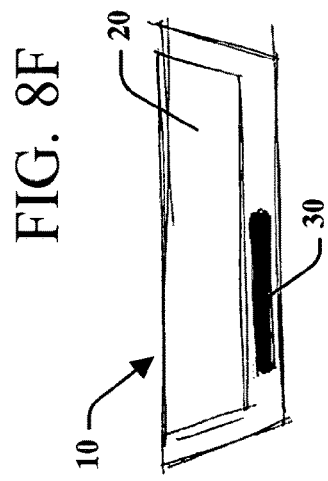
FIG. 8G
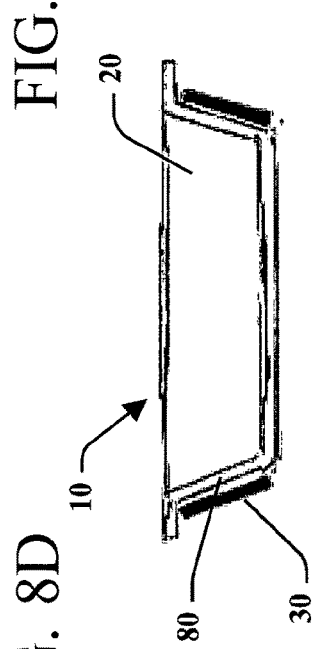
FIG. 8H

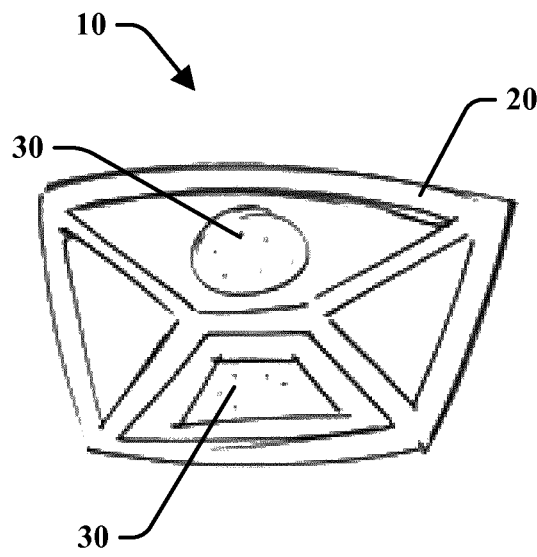
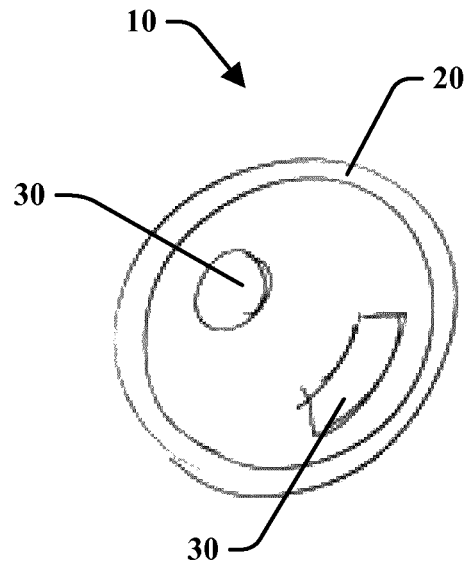
FIG. 10
FIG. 11
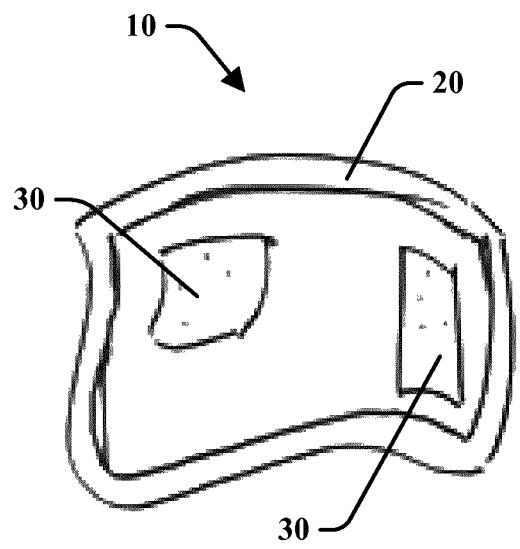
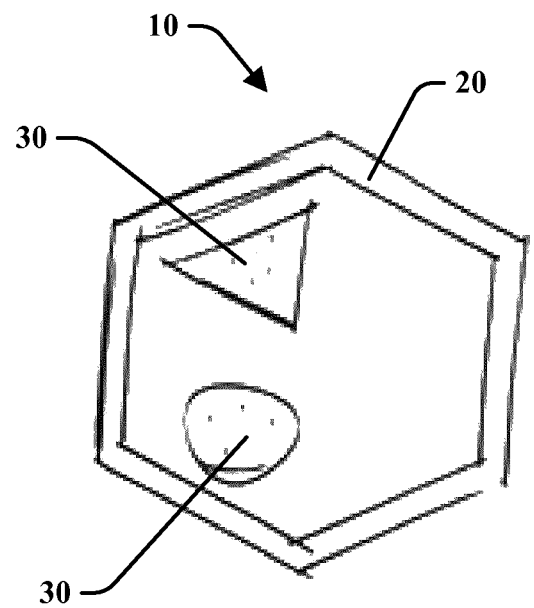
FIG. 12
FIG. 13

REUSABLE MICROWAVEABLE VESSEL

CROSS REFERENCE TO RELATED APPLICATIONS

The present application is a National Stage of International Application No. PCT/EP2016/076283, filed on Nov. 1, 2016, which claims priority to U.S. Provisional Patent Application No. 62/272,806, filed on Dec. 30, 2015, the entire contents of which are being incorporated herein by reference.

TECHNICAL FIELD

The present invention relates to a reusable vessel having an area for holding a food item and being heated in a solid state microwave oven. Additionally, the present invention relates to a method for heating a food item contained within a vessel in a solid state microwave oven.

BACKGROUND

Household microwave ovens are very common appliances with more than 90% household penetration in the US and comparable numbers in other industrialized countries. Besides the re-heating of leftovers, the preparation of frozen meals and snacks is considered to be the most important use of microwave ovens in the US. The main benefit of microwave ovens is their speed, which is a result of the penetration of the electro-magnetic waves into the food items. Although this heating mechanism is sometimes called 'volumetric heating', it is important to know that the heating pattern is not very even throughout the volume of the food. In fact, there are several aspects of today's household microwave ovens and their interaction with food that can lead to unsatisfactory results: The vast majority of household microwave ovens have a magnetron as microwave source, because this device is inexpensive and delivers enough power for quick heating. However, the frequency of microwaves from magnetrons is not controlled precisely and may vary between 2.4 and 2.5 GHz (for most household ovens). Consequently, the pattern of high and low intensity areas in the oven cavity is generally unknown and may even vary during the heating process.

Solid State Microwave Technology is a new technology and offers several advantages over magnetron-based technology. The main difference lies in the precise control of the frequency, which is a result of the semiconductor-type frequency generator in combination with the solid state amplifier. The frequency is directly related to the heating pattern in the cavity, so a precise frequency control leads to a well-defined heating pattern. In addition, the architecture of a solid state system makes it relatively easy to measure the percentage of microwaves that are being reflected back to the launchers. This feature is useful for scanning the cavity with a frequency sweep and determining which frequency, i.e. pattern, leads to more absorption by the food and which is less absorbed. Multi-channel solid state systems offer additional flexibility in that the various sources can be operated at the same frequency, with the option of user-defined phase angles, or at different frequencies. The solid state microwave technology is further described for example in: P. Korpas et al., Application study of new solid-state high-power microwave sources for efficient improvement of commercial domestic ovens, IMPI's 47 Microwave Power, Symposium; and in R. Wesson, NXP RF Solid State cooking White Paper, NXP Semiconductors N.V., No. 9397 750 17647 (2015). Examples of such solid state microwave ovens are described in US2012/0097667 (A1) and in US2013/0056460(A1).

Microwave susceptors are materials that show a strong absorption of microwaves. Typically, the word 'susceptor' in the context of food items refers to a laminated packaging material with a thin layer of aluminum embedded between a polyester and a paper layer. The purpose of susceptors is to heat up to temperatures up to 220° C. in the microwave oven and to impart browning and crisping to the food surface. This concept requires a good contact between the susceptor and the food surface for sufficient heat transfer. Without an intense heat transfer, susceptors lose their intended functionality, which is why susceptors are commonly applied with the active layer facing the food. In this configuration there is typically only a 12 micron polyester layer between the aluminum layer that generates the heat and the food item.

Frozen prepared meals often come in multi-compartment trays. The food components or items in the various compartments are usually very different in nature and therefore have different requirements of heating. A common problem is that the amount of energy supplied to each of the compartments does not meet the culinary requirements of the food therein. For instance, the meat component of a meal typically requires more energy than the vegetable component. Since all components need to reach a safe temperature, the vegetable portion is often overcooked. There is therefore a clear and persisting need to provide a solution for a more targeted heating effect for the different food items of a prepared meal and/or compartments of food trays comprising those food items, respectively.

Furthermore, consumers often want to use own fresh or pre-prepared food items for heating in a microwave oven before consumption. For this purpose consumers prefer to use household vessels which are solid, washable (for example in a dish-washer) and re-usable. A common problem with presently known household vessels for heating food items in a microwave oven such as for example a solid state microwave oven is that the food items present in such a vessel will all be heated up in a same undifferentiated way. However, for example a meat item of a composed food product or meal may typically require more energy than a vegetable item. Since all components need to reach a safe and sufficient temperature for cooking, consumers then tend to heat the entire food products or meal in a vessel to the required heating and cooking conditions of the food item needing the most energy intake. Thereby, more delicate food items such as e.g. vegetable portions are then often overcooked. There is therefore a clear and persisting need in the industry and art to provide a solution for a new heating vessel for heating food products in a solid state microwave oven and thereby providing a targeted heating effect to different parts or items of the food product provided therein.

SUMMARY

The object of the present invention is to improve the state of the art and to provide a solution for heating a food product in a solid state microwave oven to overcome at least some of the inconveniences described above. Particularly, the object of the present invention is to provide a vessel designed for being heated in a solid state microwave oven, where at least two different food items can be heated simultaneously, but each to a different final temperature. A further object of the present invention is to provide a vessel where individual food items can be heated, respectively cooked, more regularly and in a controlled way. A still further object of the present invention is to provide a solution where two or more different food items can be heated simultaneously in one vessel to achieve optimal cooking of each different food item at the same time at the end of the same heating period. Particularly, the object is to provide a solution where a meat product, such as a beef, chicken, lamb or pork product, can be cooked to perfection in a microwave oven at the same time as a vegetable product and/or a pasta, noodle, rice or potato product present in a same dish at the same time.

A still further object of the present invention is to provide such a vessel as specified above which is producible at an industrial large scale and at reasonable costs. Particularly, the vessel may be designed to be used in multiple cooking applications, such as for example for providing the vessel separate or with a food item such as frozen food dishes to be heated in a solid state microwave oven by the consumer before consumption. The vessel may be washable and re-useable to store, transport, and cook food items in the solid state microwave oven.

The object of the present invention is achieved by the subject matter of the independent claims. The dependent claims further develop the idea of the present invention.

Accordingly, the present invention provides in a first aspect a vessel having an area for holding a food item and being heated in a solid state microwave oven, the vessel comprising, a tray and a susceptor, wherein the susceptor is integrated or attached to a bottom of the tray and covers a part of the surface of the bottom of said tray, such that there is a thermal insulation between the susceptor and the food item.

In a second aspect, the invention relates to a method for heating a food item in a solid state microwave oven comprising the steps of placing the food item onto an area for holding the food item of the vessel according to the present invention and heating the food item or parts thereof in the vessel in a solid state microwave oven at a selected frequency of between 900 and 5800 MHz.

In a third aspect, the present invention is to provide a vessel having at least one area for holding food items where individual food items can be heated, respectively cooked, more regularly and in a controlled way. A still further object of the present invention is to provide a vessel where two or more different food items can be heated simultaneously in the same vessel to achieve optimal cooking of each food item at the same time and at the end of the same heating period. Particularly, the object is to provide a vessel where a meat product, such as a beef, chicken, lamb or pork product, can be cooked to perfection in a solid state microwave oven at the same time as a vegetable product and/or a pasta, noodle, rice or potato product present in a same vessel and at the same time.

It has been surprisingly found by the inventors that when they placed a susceptor underneath one compartment of a two compartment tray and used this to heat up the same amount of frozen mashed potatoes in each compartment in a solid state microwave oven, it was not the compartment with the susceptor which heated up most, but the compartment next to it without the susceptor. Further research then revealed that the susceptor absorbed a considerable amount of the energy from the solid state microwave oven. Thus, this shifted the balance of heating in favor of the side without the susceptor underneath the tray in a way that is different from a pure shielding effect. Consequently, when a susceptor is placed underneath a compartment in such a way that it cannot transfer heat energy directly to e.g. an adjacent food item, it will consume a part of the energy in its vicinity and heat up. And the heat, because of the thermal insulation, will essentially not be able to reach the adjacent compartment. Accordingly, the susceptor is not functioning to heat the food in the adjacent compartment through conduction. Hence, this observation can be used to design novel vessels for being used to heat up food items in a solid state microwave oven, where one or several susceptor(s) are placed in such way that they are thermally insulated, i.e. do not make use of the generated heat of the susceptor to heat up the food items. Instead, the novel vessel balances the heating in favor of the side without the insulated susceptor to very specifically target and heat up individual food items comprised therein. This allows for novel designs comprising different food items in one vessel, which require for example different amounts of energy for being heated or cooked appropriately. The present invention now allows designing such novel vessel embodiments which may be heated in a solid state microwave oven and where by the design of the tray in combination with the susceptor, individual different food items can be cooked all at the same time optimally and to perfection.

DESCRIPTION OF THE DRAWINGS

FIGS. 8A-8H illustrate cross sectional views of eight (8) additional embodiments of the vessel with susceptor(s) along various portions of the tray;

FIG. 10 is a bottom plan view of another embodiment of the vessel having a polygon configuration with a pair of different shaped susceptors along the tray;

FIG. 11 is a bottom plan view of another embodiment of the vessel having a rounded configuration with a pair of different shaped susceptors along the tray;

FIG. 12 is a bottom plan view of another embodiment of the vessel having a generally asymmetric configuration with a pair of different shaped susceptors along the tray; and FIG. 13 is a bottom plan view of another embodiment of the vessel having a hexagonal configuration with a pair of different shaped susceptors along the tray.

DETAILED DESCRIPTION

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments.

Figure 2:
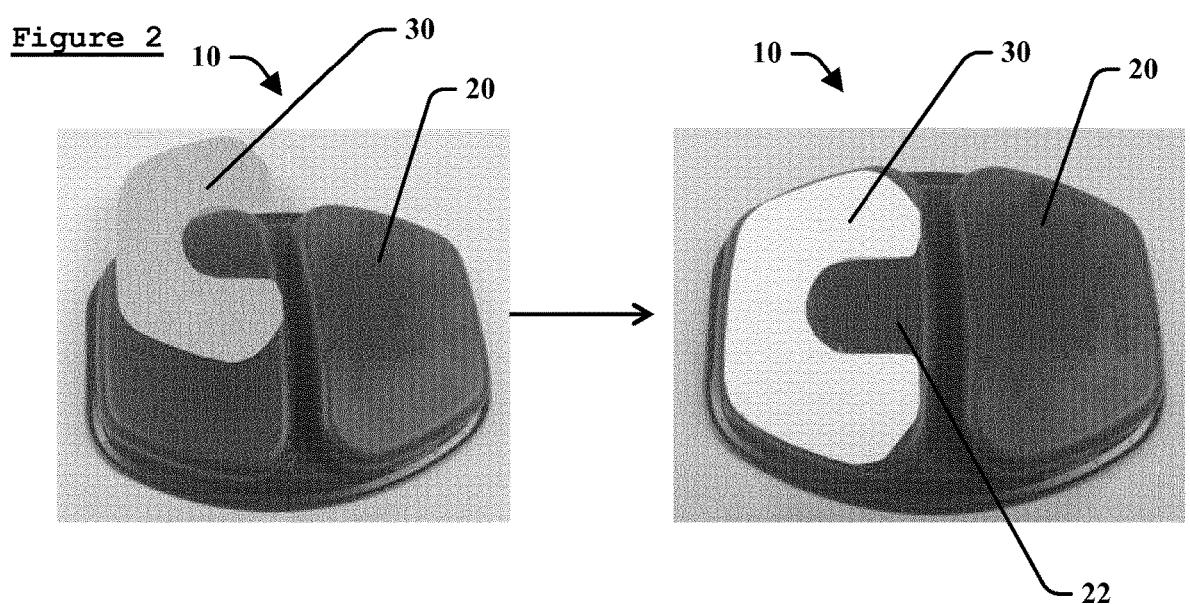
FIG. 2 is a perspective view of an embodiment of a susceptor (left) and its placement on a bottom outer surface of the tray (right)

The present invention pertains to vessel having an area for holding a food item to be heated in a solid state microwave oven. As illustrated by FIG. 2, the vessel 10 comprises a tray 20 and a susceptor 30, wherein the susceptor is integrated or attached to a bottom 22 of the tray and covers a part of the surface of the bottom of said tray 20. The vessel 10 may be made from a material selected from the group including plastic material, glass material, fiberglass material, ceramic, silicon, cellulose material, or a combination thereof. A thermal insulation is provided between the susceptor and the food to be placed in the tray. In the embodiment illustrated by FIG. 2, the susceptor 30 is in the form of a horseshoe. However, various shapes and sizes of the susceptor 30 are contemplated by this disclosure and this feature is not limited.

A "solid state microwave oven" is a microwave oven delivering solid state electromagnetic energy. Typically, production of such solid state energy is transistor-based and not magnetron produced.

A "susceptor" is a material used for its ability to absorb electromagnetic energy and to convert it to heat. Susceptors are usually made of metallized film or paper.

A "tray" is a shallow platform for carrying or holding things such as food items. For example trays are typically used for holding food items in the area of prepared dishes and frozen meals. Trays usually have a more or less flat bottom part which allows to stably placing the tray onto a surface e.g. for heating it in an oven or for putting it onto a table for ease of consumption.

"Thermal insulation" is the reduction of heat transfer between two objects of different temperatures which are in thermal contact or in range of thermal radiative influence.

In the vessel 10 of the present invention, the thermal insulation can for example be provided by a layer of plastic material, glass material, ceramic material, porcelain, cellulose based material, paper material, paperboard, silicon, Teflon or a combination thereof. Thereby the plastic material can be selected for example from PP (polypropylene) or Polyethylene terephthalate (PET), or particularly from crystallized Polyethylene terephthalate (CPET), and combinations therefrom with paper material such as for example PET laminated paperboard.

Preferably, the layer of plastic material, glass material, ceramic material, porcelain, cellulose based material, paper material, paperboard, silicon, Teflon or a combination thereof, is at least 0.20 mm thick, preferably at least 0.25 mm or 0.30 mm thick, more preferably at least 0.50 mm thick. These are preferred minimal thicknesses to assure an adequate thermal insulation between the susceptor and the closest food item in contact or which can be placed into the vessel.

In an embodiment, the tray 20 of the present invention is not thicker than 20 mm, preferably not thicker than 15 mm, more preferably not thicker than 12 mm. The tray is preferably designed to be washable and re-useable. Therefore, the tray should be thick enough to support the amount and weight of the food items to be placed therein, and to support a certain handling of the tray by the consumer such as placing it into a microwave oven, carrying it around and using it as a tray for directly eating from the package. Furthermore, the tray should be thick enough that it can be washed, for example in a dish-washer, and be re-used multiple times. However, the tray should not be too thick as to be not too heavy by itself, and not to require more production material as absolutely necessary in order to reduce production costs and environmental impact, particularly when the tray may be used multiple times by the user and stored for later use.

In a preferred embodiment, the thermal insulation of the vessel 10 has a thermal resistance value R of at least 0.0004 $m^2K/W$, preferably of at least 0.001 $m^2K/W$, more preferably of at least 0.005 $m^2K/W$, even more preferably of at least 0.01 $m^2K/W$. R stands for thermal resistance value R. R is measured in $m^2K/W$, wherein K stands for Kelvin and W for Watt. Thermal conductivity (k-value) is the ability of a material to conduct heat and it is measured in W/mK. Consequently, the value R is determined by assessing the k-value of an insulating material and measuring its thickness L as follows: $R=L/k$. Table I provides some k-values for materials typically used for making packaging trays.

TABLE I

| Material | k = W/mK at ca. 25° C. |
|---|---|
| Aluminum | 205 |
| Cellulose | 0.23 |
| Celluloid | 0.12-0.21 |
| Ceramic | 0.10-1.80 |
| Cork board | 0.043 |
| Crystallized PET (CPET) | 0.15-0.4 |
| Fiberglass | 0.04 |
| Glass | 1.05 |
| Nylon | 0.25 |
| Paper | 0.05 |
| Polycarbonate | 0.19 |
| Polyester | 0.05 |
| Polyethylene | 0.33-0.51 |
| Polypropylene (PP) | 0.1-0.22 |
| Polytetrafluorethylene (PTFE) | 0.25 |
| Polyvinylchloride (PVC) | 0.19 |
| Porcelain | 1.50 |
| Pyrex glass | 1.005 |
| Silicon | 0.15-0.32 |
| Teflon | 0.25 |
| Vinyl ester | 0.25 |

Figure 3:
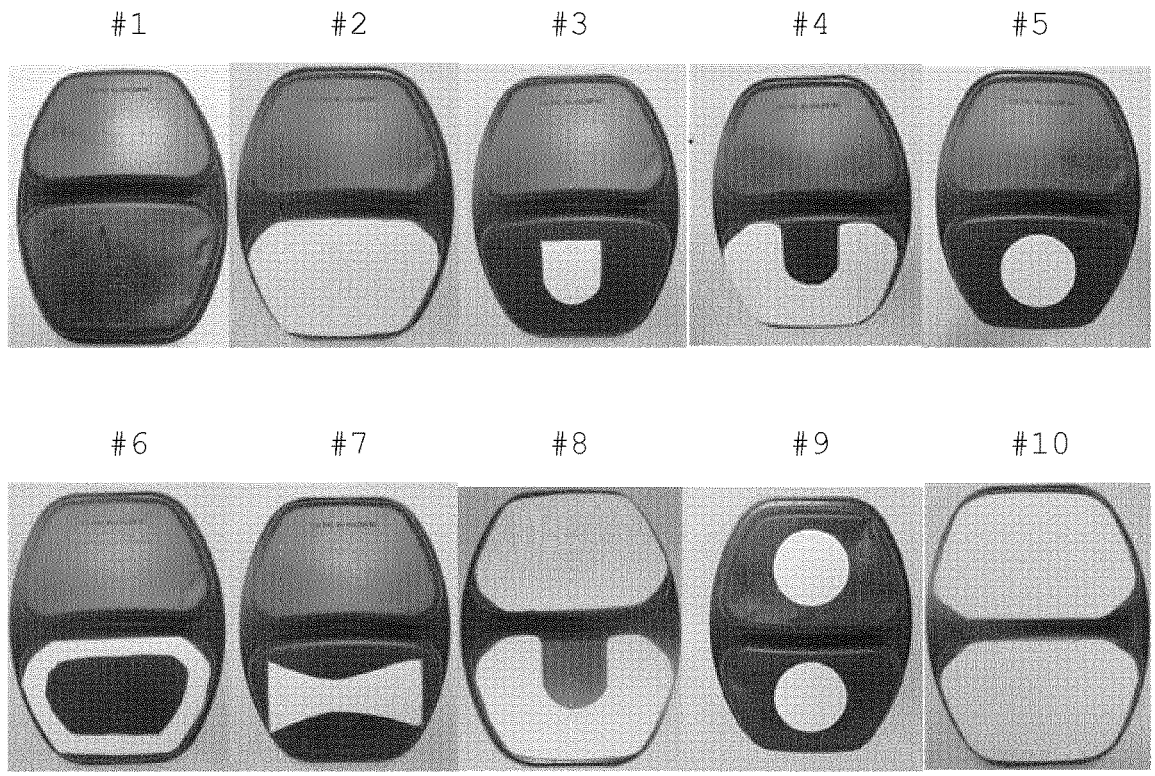
FIG. 3 illustrates bottom views of various designs of the susceptors attached to the two compartment trays.

As illustrated by the embodiments of FIG. 3, the portion of the tray 20 covered by the susceptor 30 of the vessel 10 may be up to 50% of the surface of the bottom of the tray 20. Preferably, the portion of the tray 20 covered by the susceptor 30 may be up to 40% of the surface of the bottom 22 of the tray 20. Typically however, the portion of the tray 20 covered by the susceptor 30 may be at least 20% of the surface of the bottom 22 of the tray 20.

In one embodiment of the present invention, the tray 20 of the vessel 10 may include an area for holding the food items wherein the vessel comprises at least two compartments. The area for holding the food items may be a two-compartment tray or a multi-compartment tray. A multi-compartment tray may have three, four, five or even more compartments in one tray. One of the advantages to using a two- or multi-compartment tray is that it allows to easily separate individual different food items from each other. In this way and in combination with a use and design of one or more specific susceptor(s), the bundled energy of a solid state microwave application can be very clearly local and specifically be directed and targeted to the appropriate food item(s) to be heated.

In one embodiment, only one of the compartments of the tray of the vessel is provided with a susceptor 30. However, preferably, the susceptor only spans one compartment or a part of one compartment of the vessel 10. As such, at least one of the compartments of the tray may not be provided with a susceptor 30. A further possibility may be that at least one of the compartments of the tray is shielded from microwaves in the solid state microwave oven. This would allow to include a food item into a multi-food item dish which will not be heated in the solid state microwave application. This food item may be for example a salad, a pastry, a dessert, or an ice cream.

Preferably, the vessel according to the present invention may receive at least one food item, which may comprise one, two, three or even more food items. Thereby, for example, one food item may be a meat product, preferably selected from beef, pork, chicken, lamb or fish, or a meat analogue product. A second food item may be a carbohydrate based food product, preferably selected from potato, pasta, noodle or a cereal product, including rice. A third food item may be a vegetable product, a salad, a dessert or a bakery product. In one embodiment of the present invention, the packaged food product is frozen or chilled.

The vessel of the present invention may be suitable for being used for heating a food item. In one embodiment of the present invention, the vessel is suitable for being used where the food item is frozen or chilled. For example, the vessel of the present invention can be frozen and kept frozen for a long time, e.g. several months, without cracking or deteriorating. On the other hand, this same vessel can also be used to be heated in a solid state microwave oven without cracking or deteriorating, and withstanding the general heat.

A second aspect of the present invention relates to a method for heating a food in a solid state microwave oven comprising the steps of i) placing the food item onto an area for holding the food item of the vessel according to the present invention, and ii) heating the food items or parts thereof in the vessel in a solid state microwave oven at a selected frequency of between 900 and 5800 MHz. Preferably, the selected frequency may be between 900 and 930 MHz or between 2400 and 2500 MHz.

Solid state microwave ovens have a degree of heating process control unavailable with classical magnetron driven microwave ovens. With this additional control and feedback from the heating cavity of the oven, these solid state microwave ovens can determine how much power is reflected back and adapt the heating process accordingly. In some cases, solid state microwave ovens can sweep phase and frequency of the applied microwave wavelengths methodically over a wide range and determine the highest return loss modes. This allows these ovens to set frequency and phase in such a way to ensure that the maximum microwave energy is retained within the cavity of the oven, where it is available for an optimal preparation of the food item. Therefore a preferred embodiment of the present invention pertains to a method, wherein the selected frequency corresponds to the frequency which results in the highest energy absorption of the susceptor. Thereby, the solid state microwave oven is then preferably operated at a power from 100 to 1600 Watts and for 1 to 30 minutes or more particularly, for 1 to 30 minutes.

Those skilled in the art will understand that they can freely combine all features of the present invention disclosed herein. In particular, features described for the product of the present invention may be combined with the method of the present invention and vice versa. Further, features described for different embodiments of the present invention may be combined.

Further advantages and features of the present invention are apparent from the figures and examples.

Example 1

Reference sample before microwave heating.

Figure 1:
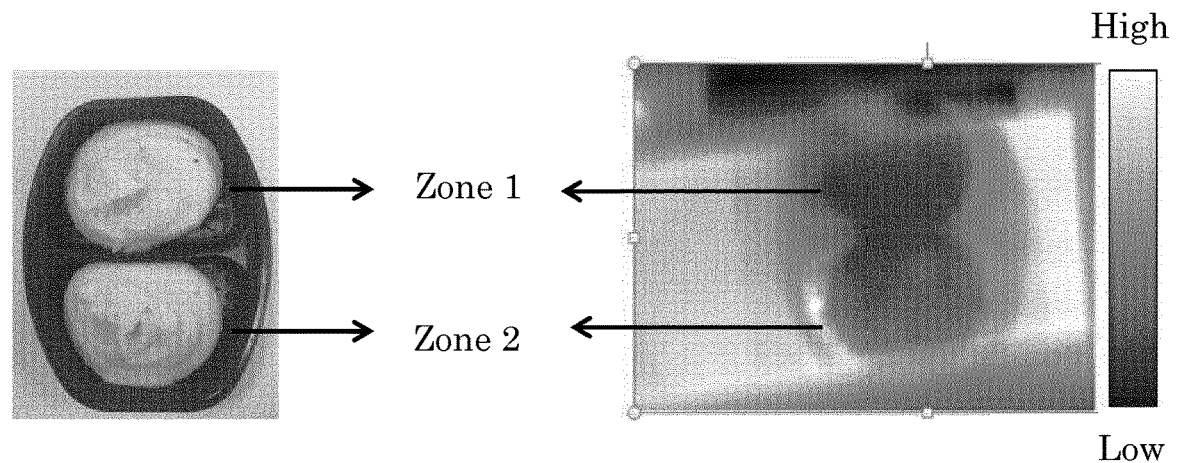
FIG. 1 is an top schematic view of a package having a two compartment tray with defined zones without susceptors containing frozen mashed potatoes (left) and an infrared image corresponding to the tray indicating temperature from 'Low' to 'High'.

As illustrated by FIG. 1, equal quantities of mashed potato (132 g±2 g) were placed in a two compartment tray and frozen to −18° C. The two compartment tray was a common tray as used commercially for frozen meals and did not comprise a susceptor. It had a dimension of ca. 18.4 cm to 14.6 cm and a height of ca. 3 cm. It was made of Crystallized Polyethylene terephthalate (CPET) and had a material thickness of 0.5 mm. FIG. 1 shows the nomenclature used for the two zones/compartments of mashed potato and their corresponding infrared images taken using a FLIR Infrared Camera. It can be seen that the mashed potatoes are about equally well frozen in both compartments.

Example 2

Test samples with a susceptor fixed at the bottom of the tray in zone 2.

Susceptors used in this study were of a very thin metal layer applied to the non-food contact side of the film and laminated to a paper based substrate (from Lorence & Pesheck, 2009). Susceptors in certain selected designs were then fixed to the outer bottom at zone 2 of the same CPET trays as described in Example 1 (FIG. 2). The susceptors were fixed to the trays in such a way that the metal part of the susceptor faced the surface of the tray.

Figure 4:
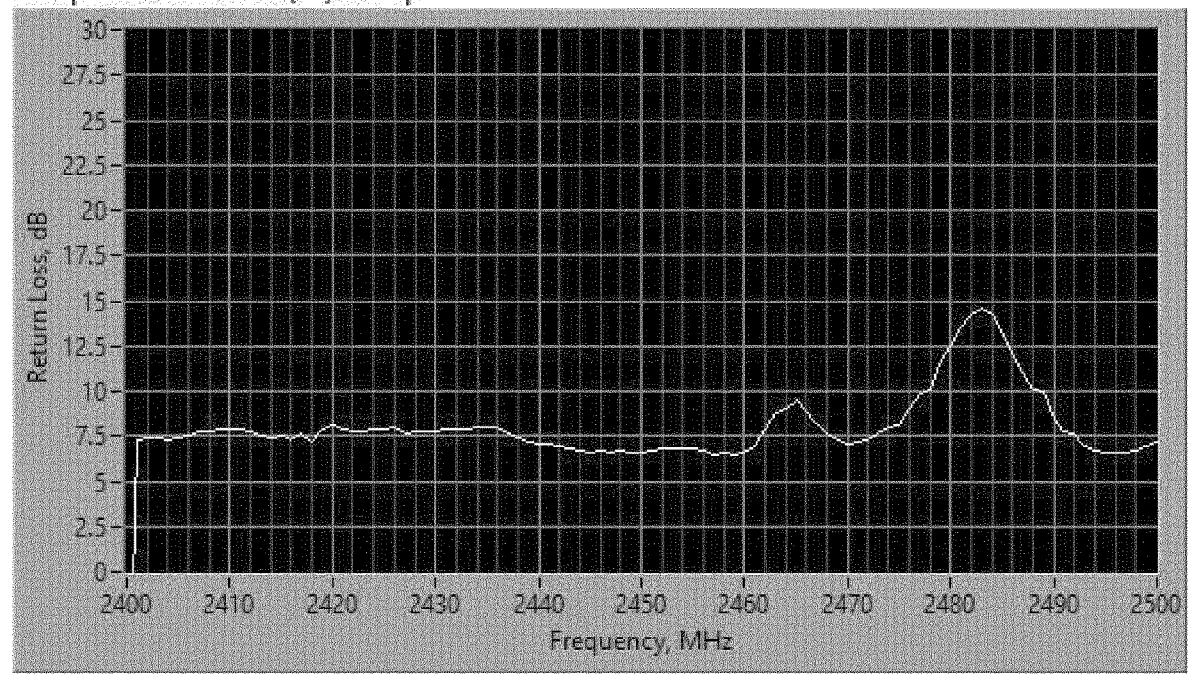
FIG. 4 is a graph of a frequency scan measuring energy absorption of the two compartment trays of FIG. 3 in a solid state microwave oven.

Different designs and forms of the susceptor as shown in FIG. 3 were used and tested in a solid state microwave oven. For this, each sample tray was filled with mashed potatoes as described in Example 1 and thereafter frozen at −18° C. Thereafter, the samples were put into a solid state microwave oven, where the oven system identified first the frequency with the highest energy absorption, i.e. the highest return loss. One example is shown in FIG. 4 where a highest absorption peak was observed at 2483 MHz. The highest absorption peak is related basically only to the energy absorption by the susceptor as frozen food does not absorb microwave energy well because of its low dielectric loss. The obtained frequency of the absorption peak depends on the susceptor, its form and design, and its ultimate location within the cavity of the microwave oven.

The trays were then heated in a solid state microwave oven operating at the determined frequency with the maximum energy absorption at 500 Watts for 5 minutes. Infrared images were then captured at the end of the heating and the temperatures along the edges and centre of the mashed potatoes placed in the two zones were recorded. The results are shown in the Table II here below.

TABLE II

| Sample Nr. | Peak Freq. [MHz] | Susceptor area *) [%] | Temp. Zone 1 Edge [° C.] | Temp. Zone 1 Center [° C.] | Temp. Zone 2 Edge [° C.] | Temp. Zone 2 Center [° C.] |
|---|---|---|---|---|---|---|
| #1  | 2450 | 0%   | 38 | 0  | 53 | 0  |
| #2  | 2423 | 50%  | 40 | 10 | 16 | −1 |
| #3  | 2451 | 20%  | 61 | 4  | 27 | −1 |
| #4  | 2409 | 30%  | 49 | 28 | 20 | 0  |
| #5  | 2417 | 25%  | 58 | 9  | 10 | 2  |
| #6  | 2451 | 20%  | 60 | 3  | 27 | −1 |
| #7  | 2408 | 30%  | 62 | 11 | 33 | 1  |
| #8  | 2471 | 80%  | 31 | 2  | 36 | 0  |
| #9  | 2457 | 50%  | 62 | 7  | 50 | 1  |
| #10 | 2452 | 100% | 51 | 0  | 62 | 1  |

*) Total bottom area of the tray covered by the susceptor in percent of total bottom surface of the tray.
Sample #1 is a control sample having no susceptor. As can be seen from the results, heating of the food is about identical in both zones (see temperature in centre). Heating at the edges is pretty inconsistent and variable.
Samples #2-#7 are working examples of the present invention. Particularly when looking at the temperatures in the centre of the food there is clear evidence that heating in Zone 1, not having the susceptor, is superior to heating in Zone 2, having the susceptor. Temperatures measured at the edges of the food confirm this as well.
Samples #8-#10 are again control examples. Those samples have susceptors in both zones and cover 50% or more of the bottom surface of the tray with susceptor. As can be seen from the results, there is no or much less targeted heating of only one zone. Particularly, the result of #10 (with 100% coverage of susceptor) is very similar to the result of #1, which has no susceptor at all.

CONCLUSION

Figure 5:
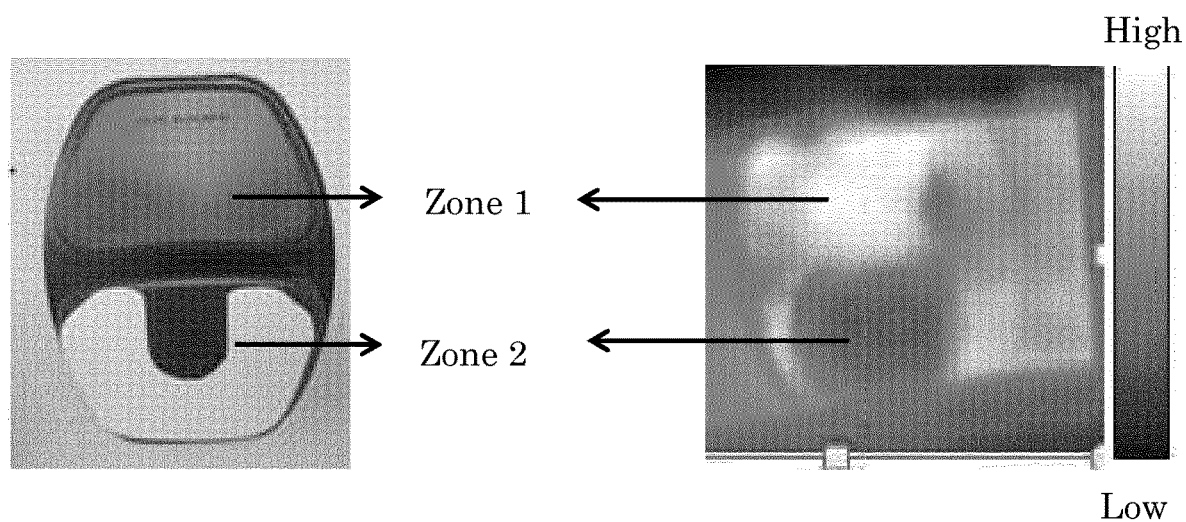
FIG. 5 is a bottom schematic view of vessel according to sample #4 of FIG. 3 with defined zones containing frozen mashed potatoes (left) and an infrared image corresponding to the tray indicating temperature from 'Low' to 'High'.

As shown in the examples presented, the invention allows to specifically target heating to e.g. only one specific compartment of a multi-compartment tray. Particularly sample #4 gave a very good result as also shown in FIG. 5. Hence, it will now be possible with the teaching of the present invention to design new vessels 10 which have for example in one compartment a meat item which needs to be cooked very well, and in another compartment a vegetable or salad item which does not need to be heated as much.

Example 3

Further vessels of the present invention can be produced with using trays having for example the following thermal resistance value R of the tray between the susceptor and the food items as specified in Table III.

TABLE III

| Type of tray: | R value of tray |
|---|---|
| CPET Tray + PET film of Susceptor | 0.001232 – 0.000462 |
| PP Tray + PET film of Susceptor | 0.001316667 – 0.000594773 |
| Pressed Paper tray + PET film of susceptor | 0.002697102 – 0.002667935 |
| CPET Tray + Paperboard of Susceptor | 0.00273142 – 0.001990587 |
| PP Tray + Paperboard of Susceptor | 0.002816087 – 0.00212336 |
| Pressed Paper Tray + Paperboard of Susceptor | 0.004196522 |

PET films typically used in the prior art on the surface of susceptors to protect for example the food item and/or the susceptor have an R value ranging from 1.75 E-05 to 4.7E-05. This R value is not sufficient to provide thermal insulation as claimed in the present invention.

Alternatively, further vessels of the same type can be produced for example with materials selected from glass, ceramics, porcelain, silicon, Teflon, or a combination therefrom.

Figure 6:
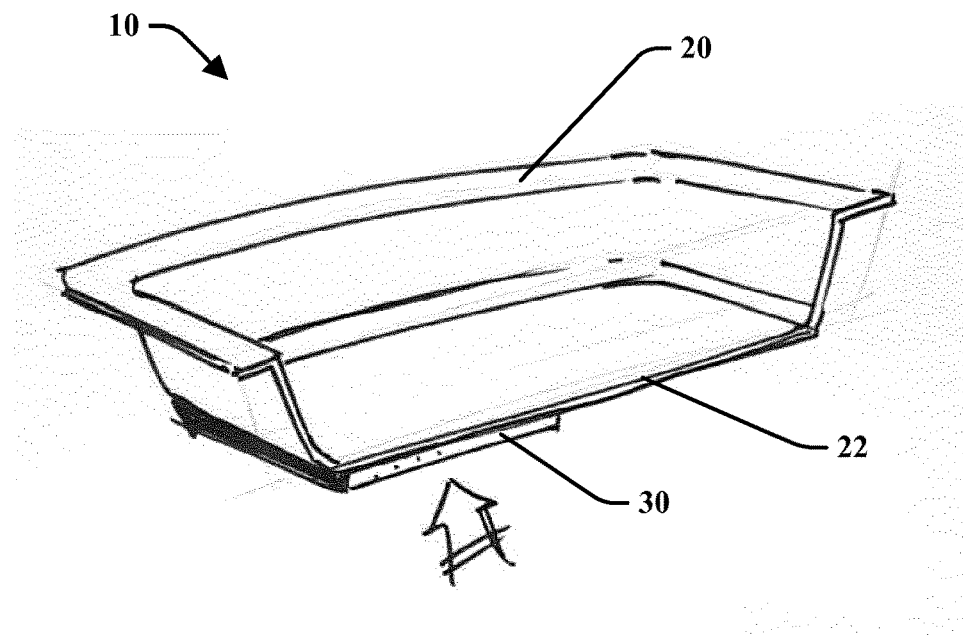
FIG. 6 is a cross sectional perspective view of an embodiment of the vessel with a susceptor on a bottom outer surface of the tray.

FIGS. 6 through 13 illustrate various embodiments of the vessel 10 in accordance with the present disclosure. FIG. 6 is a cross sectional perspective view of an embodiment of the vessel 10 with a susceptor 30 on a bottom outer surface 22 of the tray 20. This vessel 10 includes a single compartment for receiving at least one food item therein.

Figure 7:
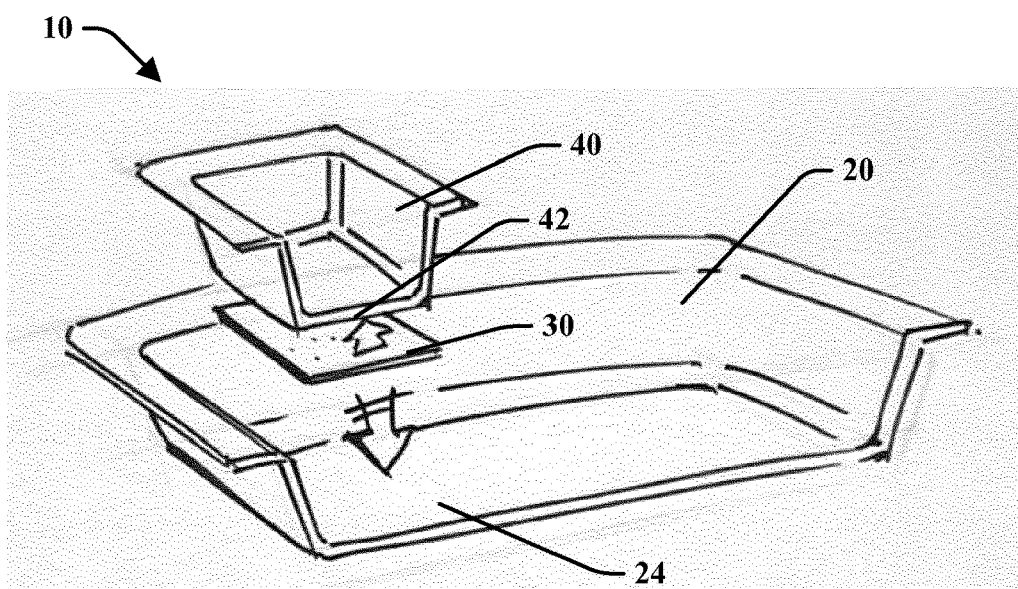
FIG. 7 is a cross sectional perspective view an another embodiment of the vessel with a susceptor placed on a bottom outer surface of a sub-tray and a bottom inner surface of a base tray.

FIG. 7 is a cross sectional perspective view of another embodiment of the vessel 10. Here the vessel includes the susceptor 30 placed between a bottom outer surface 42 of a sub-tray 40 and a bottom inner surface 24 of the tray 20. Preferably, the susceptor 30 is attached to the bottom outer surface 42 of the sub-tray 40. This embodiment of the vessel 10 includes two compartments wherein the sub-tray 40 is the first compartment that may expose the food item to influence from the susceptor 30 and the remaining portion of the tray 20 is the second compartment that may contain a separate food item from the first compartment that is not exposed to the influence from the susceptor 30. Notably, the sub-tray may be movably positioned within the tray 20 in various arrangements such that the tray 20 may be adapted to include an additional compartment adjacent the sub-tray 40 within the tray 20. This additional compartment may contain a separate food item that is not exposed to influence from the susceptor 30.

FIGS. 8A-8H illustrate cross sectional views of eight (8) additional embodiments of the vessel 10 with the susceptor(s) 30 that spans a section of the area for holding the food item and along other portions of the tray 20. In FIG. 8A the susceptor 30 is attached to the bottom of the tray 20 and spans up to about half of the bottom surface of the tray. In FIG. 8B, the tray includes two compartments wherein a first susceptor 30 is attached to the bottom of the first compartment and a second susceptor 30 is attached to the bottom of the second compartment. A wall 50 separates the first and second compartments and extends upwardly from the bottom of the tray 20 partially separating the first and second compartments. In FIG. 8C, the tray includes two compartments wherein a first susceptor 30 is attached to the bottom of the first compartment and a second susceptor 30 is attached to the bottom of the second compartment. The wall 50 separating the first and second compartment extends from the bottom of the tray 10 to a rim 60 of the tray 20.

FIG. 8D illustrates the susceptor 30 attached to the bottom of the tray 20 and spans up to about the entire bottom surface of the tray 20. FIG. 8E illustrates the tray 20 having a perimeter ridge 70 that extends along the bottom of the tray 20 and defines the bottom surface 22. The susceptor 30 may be attached to the bottom surface 22 of the tray 20 defined by the perimeter ridge 70 and spans up to about the entire bottom surface 22 of the tray 20. FIG. 8F illustrates the tray 20 having a single compartment with a plurality of susceptors 30 each aligned along the bottom surface of the tray 20. Three susceptors 30 may be attached to the bottom surface wherein each susceptor 30 may span various sized portions of the bottom surface.

FIG. 8G illustrates the vessel 10 including the tray 20 having susceptor 30 attached to the sides 80 of the tray 20. The sides 80 may define the compartment and the susceptor 30 may extend along the entire perimeter of the tray 20. Optionally, there may be a plurality of susceptors 30 positioned along the various sides 80 of the tray 20. FIG. 8ll illustrates the vessel 10 including the susceptor 30 is entirely enclosed in the material of the vessel 10. Here, the susceptor 30 is positioned within the bottom portion of the tray 20.

Figure 9A:
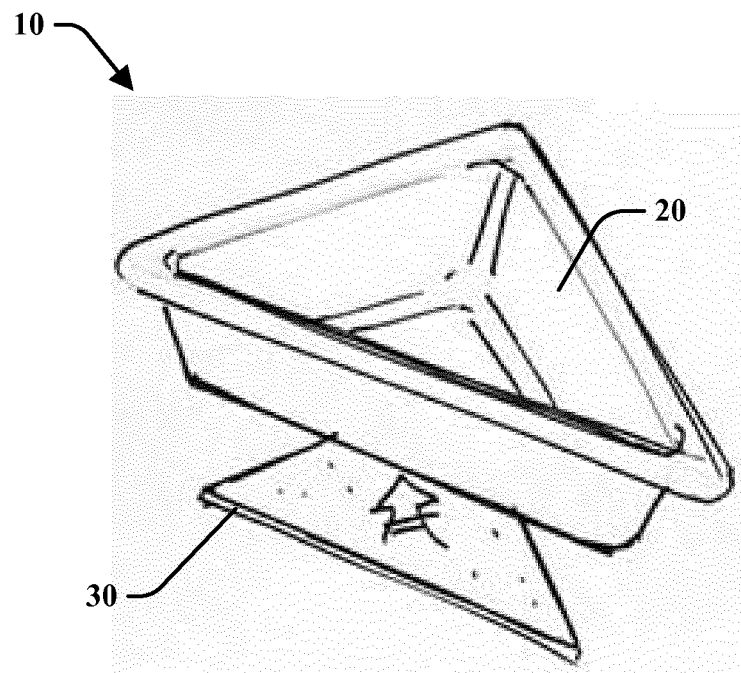
FIGS. 9A-9C illustrate a various views of other embodiments of the vessel with a general triangle shape having at least one susceptor placed on the tray.
Figure 9B:
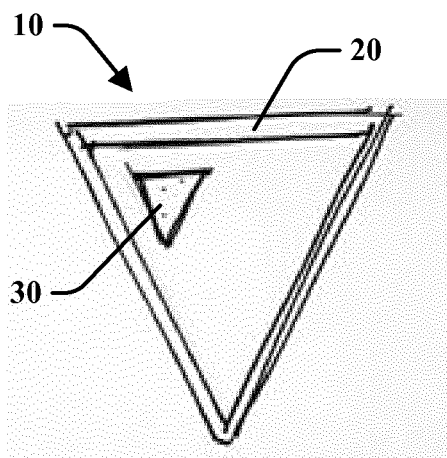
Figure 9C:
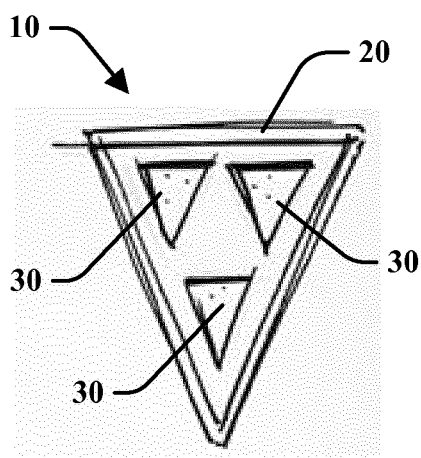

FIG. 9A illustrates the vessel 10 with a general triangle shaped tray 20 having the susceptor 30 having a general triangle shape that spans about the entire bottom of the tray 20. FIG. 9B includes the vessel 10 with a general triangle shaped tray 20 having the susceptor 30 with a general triangle shape that spans only a portion of the bottom of the tray 20. FIG. 9C illustrates the vessel 10 with a general triangle shaped tray 20 having a plurality of triangle shaped susceptors 30 that span a portion of the bottom of the tray.

FIG. 10 illustrates another embodiment of the vessel 10 having a polygon shaped tray 20 with a pair of different shaped susceptors 30 positioned along a portion of the bottom of the tray 20. FIG. 11 illustrates an embodiment of the vessel 10 having a rounded tray 20 with a pair of different shaped susceptors 30 positioned along a portion of the bottom of the tray 20. FIG. 12 illustrates another embodiment of the vessel 10 having a generally asymmetric tray 20 with a pair of different shaped susceptors 30 positioned along a portion of the bottom of the tray 20. FIG. 13 is an embodiment of the vessel 10 having a hexagonal shaped tray 20 with a pair of different shaped susceptors 30 positioned along a portion of the bottom of the tray 20. Notably, the various features described for the different embodiments of the present invention illustrated by FIGS. 8A-8G, 9A-9C, and 10-13 may be combined in various arrangements as desired for optimal heating of food items within a solid state microwave oven.

Although the present embodiments have been illustrated in the accompanying drawings and described in the foregoing detailed description, it is to be understood that the vessel is not to be limited to just the embodiments disclosed, but that the vessel described herein is capable of numerous rearrangements, modifications and substitutions. The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A method for heating food items in a solid state microwave oven, the method comprising:
   i) placing a first food item onto a first area of a vessel, the first area being configured for holding the first food item, the vessel comprising a susceptor integrated in or attached to a bottom surface of the vessel, the susceptor spans at least a portion of the first area, the vessel comprises a thermal insulation between the susceptor and the first area for holding the first food item, and the first food item is selected from the group consisting of a vegetable product, a pasta, a noodle, a rice product, a potato product, and combinations thereof;
   ii) placing a second food item onto a second area of the vessel, the second area being configured for holding the second food item and is not spanned by any susceptor, and the second food item is a meat product; and
   iii) heating the food items simultaneously in the vessel in the solid state microwave oven, the heating of the food items simultaneously in the vessel providing a lower final temperature for the first food item than the second food item,
   wherein the thermal insulation is provided by a layer of material selected from the group consisting of plastic material, glass material, ceramic material, porcelain, silicon, Teflon, and combinations thereof, and wherein the layer of material is at least 0.3 mm thick, and the vessel is washable and re-usable.

2. The method according to claim 1, wherein heating in the solid state microwave oven is at a selected frequency between 2400 and 2500 MHz.

3. The method according to claim 2, wherein the selected frequency corresponds to the frequency which results in the highest energy absorption of the susceptor.

4. The method according to claim 1, wherein the solid state microwave oven is operated at a power from 100 to 1600 Watts and the food item is heated for 1 to 30 minutes.

5. The method according to claim 1, wherein the layer of material is at least 0.5 mm thick.

6. The method according to claim 1, wherein the thermal insulation has a thermal resistance value R of at least 0.0004 $m^2K/W$.

7. The method according to claim 1, wherein the thermal insulation has a thermal resistance value R of at least 0.001 $m^2K/W$.

8. The method according to claim 1, wherein the susceptor spans up to 50% of the first area.

9. The method according to claim 1, wherein the susceptor spans at least 20% of the first area.

10. The method according to claim 1, wherein the susceptor is in the form of a horseshoe.

11. The method according to claim 1, wherein the first and second areas are compartments.

12. A method for heating food items in a solid state microwave oven, the method comprising:
   i) placing a first food item onto a first area of a vessel, the first area being configured for holding the first food item, the vessel comprising a susceptor integrated in or attached to a bottom surface of the vessel, the susceptor spans at least a portion of the first area, the vessel comprises a thermal insulation between the susceptor and the first area for holding the first food item, and the first food item is selected from the group consisting of a vegetable product, a pasta, a noodle, a rice product, a potato product, and combinations thereof;
   ii) placing a second food item onto a second area of the vessel, the second area being configured for holding the second food item and is not spanned by any susceptor, and the second food item is a meat product; and
   iii) heating the food items simultaneously in the vessel in the solid state microwave oven, the heating of the food items simultaneously in the vessel providing a lower final temperature for the first food item than the second food item,
   wherein the thermal insulation has a thermal resistance value R of at least 0.005 $m^2K/W$, and the vessel is washable and re-usable.

13. The method according to claim 12, wherein the vessel is made of a material selected from the group consisting of plastic material, glass material, fiberglass material, ceramic, porcelain, silicon, and combinations thereof.

14. The method according to claim 13, wherein the susceptor is entirely enclosed in the material.

* * * * *